(12) United States Patent
Wanser et al.

(10) Patent No.: US 9,948,607 B2
(45) Date of Patent: *Apr. 17, 2018

(54) SYSTEM AND METHOD FOR SECURING VIRTUALIZED NETWORKS

(71) Applicant: Fortinet, Inc., Sunnyvale, CA (US)

(72) Inventors: Kelly Wanser, Thornton, CO (US); Andreas Markso Antonopoulos, San Francisco, CA (US)

(73) Assignee: Fortinet, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/452,436

(22) Filed: Mar. 7, 2017

(65) Prior Publication Data

US 2017/0180323 A1 Jun. 22, 2017

Related U.S. Application Data

(63) Continuation of application No. 14/555,441, filed on Nov. 26, 2014, now Pat. No. 9,609,021, which is a
(Continued)

(51) Int. Cl.
H04L 29/06 (2006.01)
H04L 12/46 (2006.01)
H04L 12/24 (2006.01)

(52) U.S. Cl.
CPC ...... H04L 63/0263 (2013.01); H04L 12/4641 (2013.01); H04L 41/20 (2013.01); H04L 63/101 (2013.01); H04L 63/20 (2013.01)

(58) Field of Classification Search
CPC ....... H04L 63/10; H04L 63/20; H04L 63/101; H04L 12/28; H04L 49/70; H04L 45/74;
(Continued)

(56) References Cited

U.S. PATENT DOCUMENTS 7,451,483 B2 * 11/2008 Chang ................. H04L 63/0236
726/1
7,516,476 B1 4/2009 Kraemer et al.
(Continued)

OTHER PUBLICATIONS

PCT International Search Report and Written Opinion for PCT International App. No. PCT/US2013/067312 dated Jan. 3, 2014. (11 pgs).
(Continued)

*Primary Examiner* — Thanhnga B Truong
(74) *Attorney, Agent, or Firm* — Hamilton, DeSanctis & Cha LLP

(57) ABSTRACT

Systems and methods for securing a dynamic virtualized network are provided. According to one embodiment, a network policy of a dynamic virtualized network is received by an SDN controller of the dynamic virtualized network. The network policy includes network policy elements which each identify (i) an authorized endpoint, (ii) a network access device, and (iii) a port of the network access device with which the authorized endpoint is associated. A security policy for the dynamic virtualized network is generated based on the network policy, by, for each network access device, creating a set of appropriate security measures for the network access device. Each security measure specifies how network traffic in the dynamic virtualized network is to be processed by a port of the network access device. Finally, the security policy is applied to each affected network access device.

20 Claims, 11 Drawing Sheets

Related U.S. Application Data continuation of application No. 13/911,925, filed on Jun. 6, 2013, now Pat. No. 8,931,047, which is a continuation of application No. 13/842,695, filed on Mar. 15, 2013, now Pat. No. 8,931,046.

(60) Provisional application No. 61/720,343, filed on Oct. 30, 2012.

(58) Field of Classification Search
CPC ....... H04L 12/905; H04L 12/24; H04L 12/46; H04L 9/32; G06F 17/00; G06F 21/00
USPC .............. 726/1, 3, 13, 14, 15; 709/223, 224; 370/231, 254; 713/151, 153
See application file for complete search history.

(56) References Cited

U.S. PATENT DOCUMENTS

| | | | |
|---|---|---|---|
| 7,614,085 | B2 | 11/2009 | Ben-Itzhak |
| 8,099,378 | B2 | 1/2012 | Kieth, Jr. |
| 8,117,645 | B2 | 2/2012 | Lum et al. |
| 8,214,193 | B2 | 7/2012 | Chawla et al. |
| 8,239,929 | B2 | 8/2012 | Kwan |
| 8,248,958 | B1 | 8/2012 | Tulasi et al. |
| 8,775,152 | B2 | 7/2014 | Carroll et al. |
| 8,931,046 | B2 | 1/2015 | Wanser et al. |
| 8,931,047 | B2 | 1/2015 | Wanser et al. |
| 9,083,609 | B2 | 7/2015 | Casado et al. |
| 9,258,275 | B2 | 2/2016 | Sun et al. |
| 9,369,299 | B2 | 6/2016 | Dupont |
| 9,479,431 | B1 | 10/2016 | Bratt et al. |
| 9,609,021 | B2 | 3/2017 | Wanser et al. |
| 2003/0177389 | A1 | 9/2003 | Albert et al. |
| 2006/0274774 | A1 | 12/2006 | Srinivasan et al. |
| 2007/0150947 | A1 | 6/2007 | Vijayakumar et al. |
| 2007/0157286 | A1 | 6/2007 | Singh et al. |
| 2008/0052758 | A1 | 2/2008 | Byrnes |
| 2009/0113202 | A1* | 4/2009 | Hidle ............... H04L 63/0428 713/151 |
| 2010/0232290 | A1 | 9/2010 | Wong et al. |
| 2011/0320821 | A1 | 12/2011 | Alkhatib et al. |
| 2012/0044807 | A1* | 2/2012 | Johnson ............... H04L 47/20 370/231 |
| 2012/0198542 | A1* | 8/2012 | Huynh ............... H04L 63/0227 726/13 |
| 2013/0044629 | A1* | 2/2013 | Biswas ............... H04L 67/2804 370/254 |
| 2013/0266019 | A1* | 10/2013 | Qu ............... H04L 45/74 370/395.53 |
| 2014/0123211 | A1 | 5/2014 | Wanser et al. |
| 2014/0123212 | A1 | 5/2014 | Wanser et al. |
| 2015/0089583 | A1 | 3/2015 | Wanser et al. |
| 2016/0164741 | A1 | 6/2016 | Durgin et al. |
| 2017/0195207 | A1 | 6/2017 | Wanser et al. |

OTHER PUBLICATIONS

Deploying the VXLAN Feature in Cisco Nexus 1000V Series Switches, Source: http://www.cisco.com/en/US/prod/collateral/switches/ps9441/ps9902/guide_c07-702975.html#wp9000080. May 2012.

Cisco Nexus 1000V Series Switches, Source: http://www.vmware.com/files/pdf/Cisco-Nexus-Network-Analysis-Module-DS-EN.pdf. Oct. 30, 2012.

Notice of Allowance for U.S. Appl. No. 13/911,925 dated Aug. 29, 2014.

Final Rejection for U.S. Appl. No. 13/911,925 dated Jan. 31, 2014.

Non-Final Rejection for U.S. Appl. No. 13/911,925 dated Sep. 11, 2013.

Notice of Allowance for U.S. Appl. No. 14/555,441 dated Jan. 28, 2016.

Non-Final Rejection for U.S. Appl. No. 14/555,441 dated May 5, 2015.

Notice of Allowance for U.S. Appl. No. 13/842,695 dated Aug. 28, 2014.

Final Rejection or U.S. Appl. No. 13/842,695 dated Mar. 25, 2014.

Non-Final Rejection or U.S. Appl. No. 13/842,695 dated Sep. 16, 2013.

Non-Final Rejection for U.S. Appl. No. 15/465,577 dated Apr. 20, 2017.

\* cited by examiner

SYSTEM AND METHOD FOR SECURING VIRTUALIZED NETWORKS

RELATED APPLICATIONS

This application is a continuation of U.S. patent application Ser. No. 14/555,441, filed on Nov. 26, 2016, now U.S. Pat. No. 9,609,021, which is a continuation of U.S. patent application Ser. No. 13/911,925, filed on Jun. 6, 2013, now U.S. Pat. No. 8,931,047, which is a continuation of U.S. patent application Ser. No. 13/842,695, filed on Mar. 15, 2013, now U.S. Pat. No. 8,931,046, which claims the benefit of priority of U.S. Provisional Application No. 61/720,343, filed Oct. 30, 2012, all of which are hereby incorporated by reference in the entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2012-2017, Fortinet, Inc.

BACKGROUND

Field

Embodiments of the present invention generally relate to data networking and more particularly to securing access to a dynamic virtualized network that is overlaid on a physical network.

Description of the Related Art

A virtualized network is a data network that is overlaid on the top of another network, such as a physical network. Network elements in the overlaid network are connected by virtual or logical links, each of which corresponds to a path, perhaps through many physical links, in the underlying network. For example, a virtualized network is a combination of hardware and software network resources that is a single administrative entity.

One example of a virtualized network is Virtual eXtensible Local Area Network (VXLAN), where VXLAN is a layer 2 overlay over a layer 3 physical network. Each VXLAN overlay network is known as a VXLAN segment and is identified by a unique 24-bit segment ID called a VXLAN Network Identifier (VNI). Virtual machines with the same VNI are allowed to communicate with each other over the corresponding VXLAN segment. In a VXLAN segment, virtual machines are uniquely identified by the combination of Media Access Control (MAC) addresses and the VNI of that segment. A Virtual Tunnel Endpoint (VTEP) encapsulates data entering the VXLAN segment with the VNI and de-encapsulates the data traffic leaving the VXLAN segment.

In addition, VXLAN uses multicast to transport virtual machine originated traffic such as unknown destination MAC packets, broadcasts, multicast or non-Internet Protocol (IP) traffic. Multicast is also used for endpoint discovery by the VTEPs. Physical switches further use multicast snooping to build a map of the physical ports to multicast addresses in use by the end clients.

The model used for VXLAN overlay network virtualization as well as other virtualization models (e.g., Network Virtualization using Generic Routing Encapsulation (NVGRE), Stateless Transport Tunneling (STT), Overlay Transport Virtualization (OTV), etc.) use tunneling and encapsulation. In addition, these models use IP Multicast for learning new network addresses in each virtual segment. This is called conversational learning as this attempts to mimic the behavior of a traditional Ethernet network so that the instantiation of a virtualized network does not require any changes to the host stacks. For example, traditional Ethernet Network Interface Controller (NIC) drivers, Transport Control Protocol (TCP)/IP stacks, etc., continue to work and the deployment of a virtualized network is transparent to hosts and applications.

The challenge with these conversational learning models is that they rely upon relatively insecure methods of joining a virtualized segment and there are no mechanisms in place that prevents source address spoofing. For example, a rogue node in a multi-tenant cloud you can join any tenant network, bypassing every firewall, and security appliance they have in their data path.

SUMMARY

Systems and methods are described for securing a dynamic virtualized network. According to one embodiment, a current network policy of a dynamic virtualized network that is overlaid on a physical network is received by a network automation engine of a software defined network (SDN) controller associated with the dynamic virtualized network. The current network policy includes multiple network policy elements, each of which identifies (i) an authorized endpoint of multiple authorized endpoints within the dynamic virtualized network, (ii) a network access device of multiple network access devices within the dynamic virtualized network, and (iii) a port of the network access device with which the authorized endpoint is associated. A network security policy for the dynamic virtualized network is generated based on the current network policy, by, for each network access device: (i) determining whether to create one or more security measures for the network access device by evaluating those of the network policy elements involving the network access device and (ii) when the determining is affirmative, creating the one or more security measures. Each of the one or more security measures specifies how network traffic in the dynamic virtualized network is to be processed by a port of the network access device. Finally, the network security policy is applied to each network access device that is affected by the network security policy.

Other features of embodiments of the present disclosure will be apparent from accompanying drawings and from detailed description that follows.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
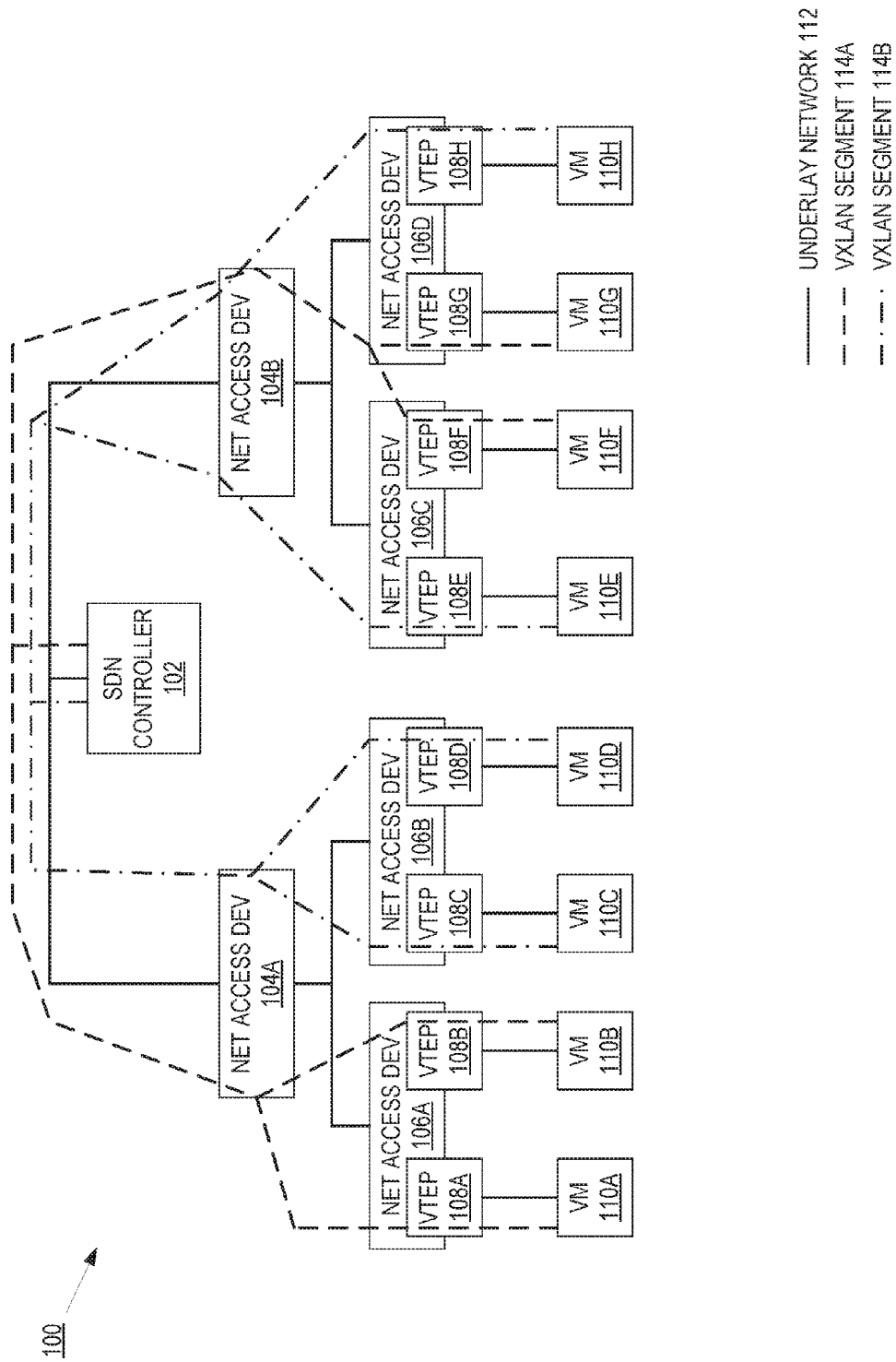
FIG. 1 is a block diagram of a system that includes dynamic virtualized networks overlaid on an underlay physical network in accordance with an embodiment of the present invention.

Systems and methods are described for securing and testing a dynamic virtualized network. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that secures and tests a dynamic virtualized network is described. In one embodiment, the device learns a VXLAN network policy from a software defined network controller and/or by snooping multicast join/leaves messages. Using this learned network policy, the device determines which network access devices of the dynamic virtualized networks are affected by the VXLAN network policy. For each affected network access device, the device determines a network security policy to help secures the dynamic virtualized network. The device can construct multicast join filters to allow multicast groups to learn the VNIs for authorized VTEP ports and drop other multicast joins, create access control lists (ACL) on ports that have VTEPs to pass authorized VNI-tagged traffic and drop other type of traffic, and/or create ingress ACLs drop VXLAN encapsulated traffic on ports that do not have an attached VTEP. The device applies the network security policy for each of the affected network access devices.

In another embodiment, the device tests the dynamic virtualized network by injecting test traffic at one of the network access devices associate with the dynamic virtualized network. The device determines which network access device to inject the test traffic and further predicts the result of the test traffic injection. The device injects the test traffic and monitors the dynamic virtualized network for the appearance and non-appearance of the injected test traffic. If the results of the injected test traffic are inline with the predicted results, the device reports the test was a success. Otherwise, the device reports an error.

FIG. 1 is a block diagram of one embodiment of a system 100 that includes dynamic virtualized networks overlaid on an underlay physical network. In FIG. 1, two virtualized networks, VXLAN 114A-B, are overlaid on top of an underlying physical network 112. In another embodiment, a virtualized network can be overlaid on top of another virtualized network. In one embodiment, this physical network 112 is a network that includes network access devices 104A-B that interconnects other network access devices 106A-D. In one embodiment, network access devices 106A-B is coupled to network access device 104A. Network access device 104A is further coupled to network access device 104B, which is in turn coupled to network access device 106A-B. In one embodiment, a network access device is a device that provides network access to a network (e.g., physical network, virtualized network, etc.). A network access device can be a switch, router, hub, bridge, gateway, etc., or any type of device that can allow access to a network. While in one embodiment the interconnection between the different network access devices is a wired connection (e.g., copper, fiber, etc., and/or a combination thereof), in alternate embodiments, a different type of interconnection is used (e.g., wireless, a combination of wireless and wired, etc.). In one embodiment, the physical network 112 is layer 3 network, in which the network access devices 104A-B and 106A-D are communicating data using a layer 3 protocol (e.g., Internet Protocol (IP), Asynchronous Transfer Mode (ATM), etc.) or a combination of layer 3 protocol and another layer protocol (e.g., Ethernet switching, Infiniband, Ethernet routing, multiprotocol layer switching (MPLS), Synchronous Optical Networking (SONET), Satellite networking protocols, etc.). For example and in one embodiment, the physical network 112 is a layer 3 IP network interconnected by copper and/or fiber Ethernet connections. While in one embodiment, network access devices 104A-B are connected by a local area network (LAN), in alternate embodiments the coupling between the network access devices 104A-B is different (e.g. coupled by multiple links that have the same or different physical media and protocols, coupled a wide area network, etc.).

In FIG. 1, two VXLAN segments 114A-B are overlaid the physical network 112. As described above, each VXLAN segment 114A-B is a layer 2 overlay over a layer 3 physical network. Each VXLAN segment is identified by a unique 24-bit segment ID called a VXLAN Network Identifier (VNI). Virtual machines with the same VNI are allowed to communicate with each other over the corresponding VXLAN segment. Virtual machines that are coupled to the VXLAN segment are identified uniquely by the combination of their MAC addresses and VNI. A Virtual Tunnel Endpoint (VTEP) encapsulates data entering the VXLAN segment and de-encapsulates the data traffic leaving the VXLAN segment. In one embodiment, each VTEP enforces a network security policy to the network data being communicated through that VTEP. In one embodiment, a network automation engine generates and applies a network security policy for each VTEP as described with reference to FIG. 3 below.

In one embodiment, the network access device 106A-D includes the VTEPs 108A-H that are used encapsulate/de-encapsulate network data communicated with virtual machines (VM) 110A-H. In one embodiment, a virtual machine is a software implementation of a machine (e.g. a computer, switch, etc.) that executes programs like a physical machine. The virtual machine can be a system virtual machine that provides a virtualized operating system platform to run one or more applications (e.g., hardware virtualization). In another embodiment, the virtual machine represents a plurality of virtual machines that are coupled to the same VXLAN segment via the same VTEP. In a further embodiment, the virtual machine represents one or more physical and/or virtual devices that communicate network data through the corresponding VTEP (e.g., the VM could represent a physical device, a switch or other network access device, a firewall, etc. and/or a combination thereof).

In one embodiment, the Software Defined Network (SDN) controller 102 is a device that has the VTEP configurations for each VXLAN segment. In one embodiment, the VTEP configuration includes which VTEPs are authorized for each VXLAN segment and where the VTEPs are located (e.g., the port and network access device where that VTEP is located).

In addition, VXLAN segments 114A-B use multicast to transport virtual machine originated traffic such as unknown destination MAC packets, broadcasts, multicast or non-IP traffic. In addition, multicast is used for endpoint discovery by the VTEPs. Physical switches further use multicast snooping to build a map of the physical ports to multicast addresses in use by the end clients.

While in one embodiment, there are two VXLAN segments 114A-B illustrated in FIG. 1, in alternate embodiments, there can more or less VXLAN segments. In one embodiment, VXLAN segment 114A couples VMs 110A, 110B, 110F, and 110G so that these VMs can communicate using a layer 2 protocol. In this embodiment, VMs 110A-B couple to network access device 106A via VTEP 108A-B, respectively. In addition, VM 110F couples to network access device 106C via VTEP 108F and VM 110G couples to network access device 106D via VTEP 108G. By coupling VMs 110A, 110B, 110F, and 110G using VXLAN segment 114A, these VMs can communicate using a layer 2 protocol over a local or wide area network.

In one embodiment, the VMs 110A, 110B, 110F, and 110G dynamically couple to the VXLAN segment 114A using a corresponding VTEPs 108A, 108B, 108F, and 108G. In this embodiment, as one of the VMs 110A, 110B, 110F, and 110G is provisioned, that VM couples to the corresponding VTEP. That VTEP discovers the newly provisioned VM and allows the provisioned VM to communicate on that VXLAN segment. In one embodiment, the network data communicated using VXLAN segment 114A is encapsulated with a header that includes the VNI associated with VXLAN segment 114A.

In one embodiment, the VXLAN segment 114A is dynamic because the VMs coupled to the VXLAN segment can join or leave the VXLAN segment using a multicast join or leave message. For example and in one embodiment, VM 110A joins the VXLAN segment 114A by sending an IGMP join message to the SDN controller 102. In response, network access devices 106A and 104A, and SDN controller 102 save information in the respective tables that VM 110A is part of VXLAN segment 114A.

In one embodiment, VXLAN segment 114B couples VMs 110C, 110D, 110E, and 110H so that these VMs can communicate using a layer 2 protocol. In this embodiment, VMs 110C-D couple to network access device 106B via VTEP 108C-D, respectively. In addition, VM 110E couples to network access device 106C via VTEP 108E and VM 110H couples to network access device 106D via VTEP 108H. By coupling VMs 110C, 110D, 110E, and 110H using VXLAN segment 114B, these VMs can communicate using a layer 2 protocol over a local or wide area network. In addition, VMs 110C, 110D, 110E, and 110H dynamically couple to the VXLAN segment 114B. In one embodiment, the network data communicated using VXLAN segment 114B is encapsulated with a header that includes the VNI associated with VXLAN segment 114B.

In one embodiment and similar to VXLAN segment 114A, the VXLAN segment 114B is a dynamic virtualized network because the VMs coupled to this VXLAN segment 114B can join or leave this VXLAN segment using a multicast join or leave message. For example and in one embodiment, VM 110C joins the VXLAN segment 114B by sending an IGMP join message to the SDN controller 102. In response, network access devices 106A and 104B and SDN controller 102 save information in the respective tables that VM 110A is part of VXLAN segment 114A.

In the VXLAN segments 114A-B illustrated in FIG. 1, some of the networks access devices 104A-B and 106 A-D participate in one or both of the VXLAN segments. For example and in one embodiment, network access device 106A and 106B participate in one VXLAN segment (VXLAN segments 114A and 114B, respectively). In addition, network access devices 104A-B and 106C-D participate in both VXLAN segments 114A-B. In one embodiment, network access device 104A-D include VTEPs 108A-H to encapsulate/de-encapsulate network data being communicated with the respective VMs 108A-H. In one embodiment, the network access devices 106A-B communicate VXLAN encapsulated traffic for both VXLAN segments 114A-B, but neither of these network access devices includes a VTEP used to couple to a VM. In this embodiment, network access devices 106A-B are used to transit VXLAN segment network data between the corresponding VMs 108A-H and is not used to terminate a VXLAN segment.

While the VXLAN segments 114A-B, as illustrated, can communicate network data between the VMs that are part of the corresponding VXLAN, the security of the VXLAN segments 114A-B is only as good as the security of each device that participates in the VXLAN segment. For example and in one embodiment, if there is a compromise at any of the network elements (e.g., network access device and/or SDN Controller), then one, some, or all of the VXLAN segments can be compromised. In addition, if one VXLAN segment is compromised, because some of the network access devices may participate in more than one VXLAN segment and/or the SDN controller, other VXLAN segment can be compromised as well. While the system 100 in FIG. 1 is described in reference a VXLAN network, the invention described herein can be used for other virtualized networks (e.g., NVGRE, STT, and OTV).

Figure 2:
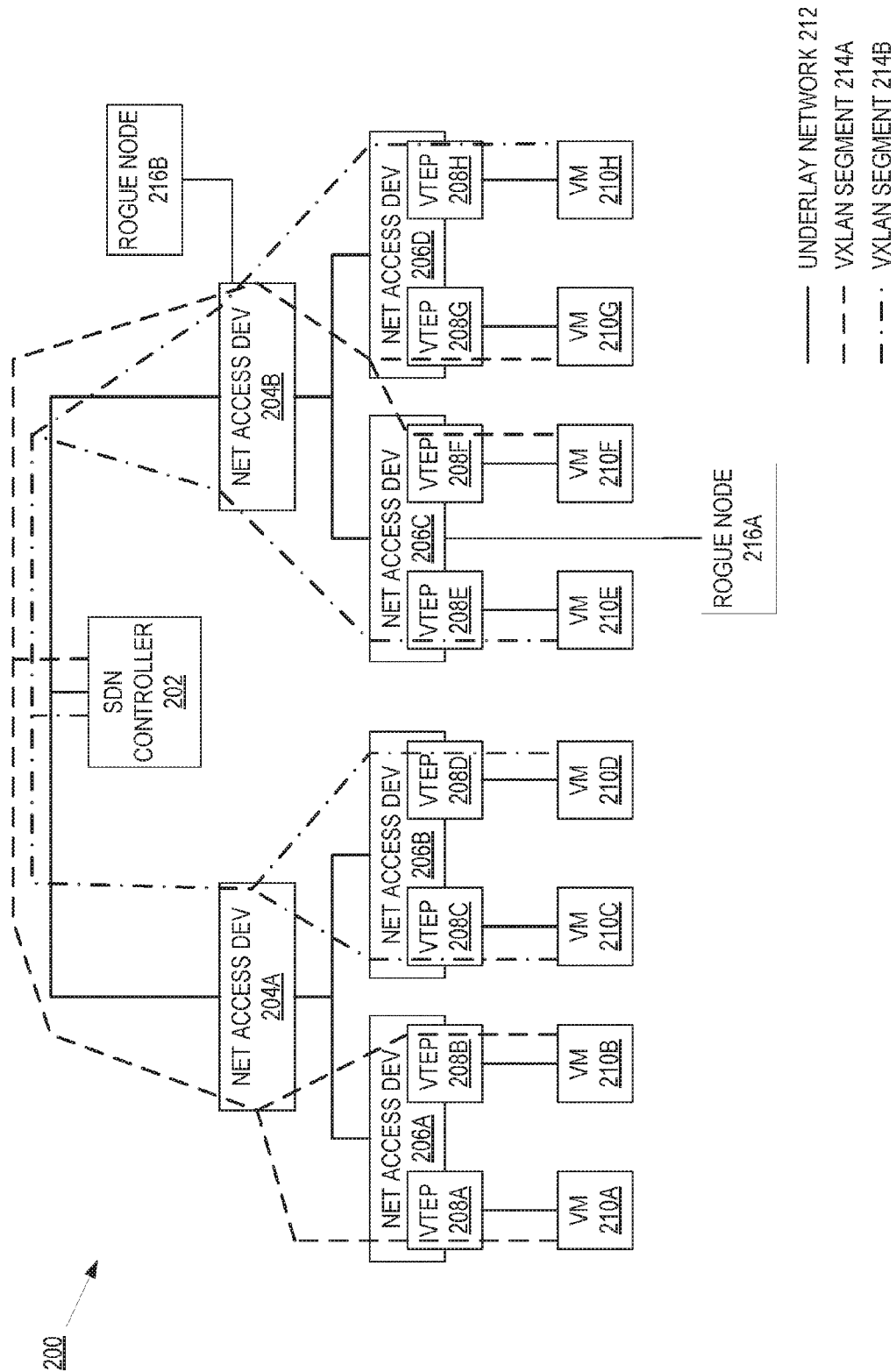
FIG. 2 is a block diagram of a system that includes dynamic virtualized networks overlaid on an underlay physical network, where the dynamic virtualized networks include rogue nodes that can compromise one, some, or all of the VXLAN segments, in accordance with an embodiment of the present invention.

FIG. 2 is a block diagram of one embodiment of a system 200 that includes dynamic virtualized networks 214A-B overlaid on an underlying physical network 212, where the dynamic virtualized networks include rogue nodes 202A-B that can compromise the some or all of the VXLAN segments 214A-B. In FIG. 2, the underlying network 212 and VXLAN segments 214A-B are similar physical network 112 and VXLAN segments 114A-B as described with reference to FIG. 1 above. In one embodiment, the underlying network includes network access device 204A that is coupled to network access devices 204B and network access devices 206A-B. In addition, network access device 204B is coupled to network access devices 206C-D. As in FIG. 1, underlying network 212 can be a layer 3 network or a mixture of layer 2 and 3 networks. Overlaid on network 212 is VXLAN segments 214A-B. In one embodiment, VXLAN segment 214A couples VMs 210A, 210B, 210F, and 210G so that these VMs can communicate using a layer 2 protocol. In this embodiment, VMs 210A-B couple to network access device 206A via VTEP 208A-B, respectively. In addition, VM 210F couples to network access device 206C via VTEP 208F and VM 210G couples to network access device 206D via VTEP 208G. By coupling VMs 210A, 210B, 210F, and 210G using VXLAN segment 214A, these VMs can communicate using a layer 2 protocol over a local or wide area network. In one embodiment, the network data communicated using VXLAN segment 214A is encapsulated with a header that includes the VNI associated with VXLAN segment 214A.

In one embodiment, VXLAN segment 214B couples VMs 210C, 210D, 210E, and 210H so that these VMs can communicate using a layer 2 protocol. In this embodiment, VMs 120C-D couple to network access device 206B via VTEP 208C-D, respectively. In addition, VM 120E couples to network access device 206C via VTEP 208E and VM 120H couples to network access device 206D via VTEP 208H. By coupling VMs 210C, 210D, 210E, and 210H using VXLAN segment 214B, these VMs can communicate using a layer 2 protocol over a local or wide area network. In one embodiment, the network data communicated using VXLAN segment 214B is encapsulated with a header that includes the VNI associated with VXLAN segment 214B. In addition, system 200 includes a SDN controller 202 that is a device that includes the VTEP configurations for each VXLAN segment.

Unlike in FIG. 1, in FIG. 2, the network 200 includes two rogue nodes 202A-B that may compromise VXLAN segments 214A-B. In one embodiment, the rogue node can be a virtual machine that couples to one on the network access devices. In another embodiment, the rogue node can be a physical node that couples to the network access device. In one embodiment, a rogue node can result from a software exploit, an attack by a hacker, error in cabling, configuration error, operator error, etc., and/or a combination thereof. In one embodiment, in a regulated industry, the appearance of a rogue node can cause a compliance violation even though the rogue node does not appear maliciously. For example and in one embodiment, a rogue node could arise because a server that can host one or more virtual machines is exploited and a new, unauthorized virtual machine is created and provisioned. In one embodiment, rogue device 216A is coupled to network access device 206C, where the rogue node 216A couples to a network access device 206C that include one or more VTEPs (e.g. VTEPs 208E-F). In one embodiment, rogue device 216B is coupled to network access device 204B, where the rogue node 216B couples to a network access device 204B that does not include a VTEP and is used to transit VXLAN encapsulated network data.

In one embodiment, if a rogue node (e.g., 216A or 216B) can compromise one or more of the VXLAN segments 214A-B, the rogue node is an unauthorized virtual machine that can have access to the either or both VXLAN segments 216A-B. For example and in one embodiment, the rogue node can mirror network data to another port, monitor the network data to steal/copy, compromise other nodes in that VXLAN segment, inject undesired network data into that VXLAN segment (e.g., injecting network data to deny services, etc.), etc., and/or a combination thereof.

Figure 3:
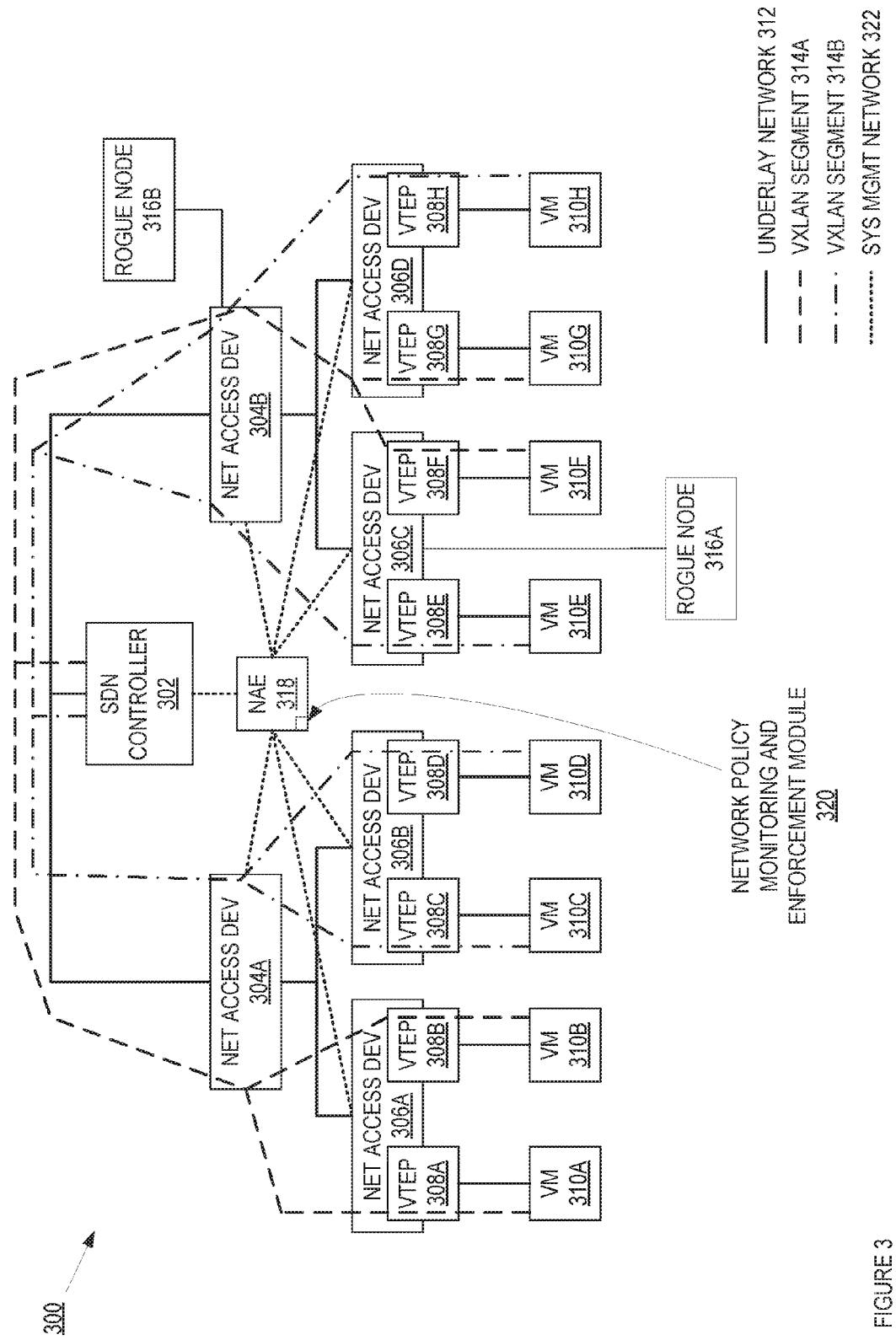
FIG. 3 is a block diagram of a system that includes a network automation engine that is used to secure the dynamic virtualized networks in accordance with an embodiment of the present invention.

As described above, the VXLAN segments 214A-B of FIG. 2 can be compromised by rogue nodes 216A-B because the VXLAN model relies on a relatively insecure model of joining a VXLAN segment. FIG. 3 is a block diagram of one embodiment of a system 300 that includes a network automation engine 318 that is used to secure the dynamic virtualized networks. In one embodiment, the underlying network 312 and VXLAN segments 314A-B are similar as described with reference to FIG. 1 above. In one embodiment, the underlying network 312 includes network access device 304A that is coupled to network access devices 304B and network access devices 306A-B. In addition, network access device 304B is coupled to network access devices 306C-D. As in FIG. 1, underlying network 312 can be a layer 3 network or a mixture of layer 2 and 3 networks. Overlaid on network 312 is VXLAN segments 314A-B. In one embodiment, VXLAN segment 314A couples VMs 310A, 310B, 310F, and 310G so that these VMs can communicate using a layer 2 protocol. In this embodiment, VMs 310A-B couple to network access device 306A via VTEP 308A-B, respectively. In addition, VM 310F couples to network access device 306C via VTEP 308F and VM 310G couples to VTEP 308G on network access device 306D. By coupling VMs 310A, 310B, 310F, and 310G using VXLAN segment 314A, these VMs can communicate using a layer 2 protocol over a local or wide area network. In one embodiment, the network data communicated using VXLAN segment 314A is encapsulated with a header that includes the VNI associated with VXLAN segment 314A.

In one embodiment, VXLAN segment 314B couples VMs 310C, 310D, 310E, and 310H so that these VMs can communicate using a layer 2 protocol. In this embodiment, VMs 310C-D couple to network access device 306B via VTEP 308C-D, respectively. In addition, VM 310E couples to network access device 306C via VTEP 308E and VM 310H couples to VTEP 308H on network access device 306D. By coupling VMs 310C, 310D, 310E, and 310H using VXLAN segment 314B, these VMs can communicate using a layer 2 protocol over a local or wide area network. In one embodiment, the network data communicated using VXLAN segment 314B is encapsulated with a header that includes the VNI associated with VXLAN segment 314B. In addition, system 300 includes a SDN controller 302 that is a device that includes the VTEP configurations for each VXLAN segment.

In one embodiment, system 300 include two rogue nodes 316A-B that are unauthorized nodes attempting to compromise either one or both of the VXLAN segments 314A-B. In one embodiment, the rogue nodes 316A-B are similar to rogue nodes 216A-B as described with reference to FIG. 2 above. In order to assist in preventing a compromise of one or both of the VXLAN segment, system 300 includes a network automation engine (NAE) 318 that learns the current network policy of the VXLAN segments 314A-B and determines a network security policy that can help further secure these VXLAN segments. For example and in one embodiment, NAE 318 constructs multicast join filters to allow multicast groups to learn the VNIs for authorized VTEP ports and drop other multicast joins, create access control lists (ACL) on ports that have VTEPs to pass authorized VNI-tagged traffic and drop other type of traffic, and/or create ingress ACLs drop VXLAN encapsulated traffic on ports that do not have an attached VTEP. Furthermore, NAE 318 applies this network security policy for each network access devices that is affected by the network security policy. In one embodiment, the current and security network policies includes a different set of network policy elements and the set of network policy elements for the network security policy does not include a network policy element that is include in the current network policy set of network policy elements. In one embodiment, the current network policy includes VTEP configurations that identify the authorized VTEPs and port location. In one embodiment, a network policy element is an instruction that determines how a port of network access device processes a certain type of network data.

In one embodiment, by having a multicast join filter for a port of one of the network access devices 304A-B and/or 306A-D allows the network access device 304A-B and/or 306A-D to drop multicast join requests that are on ports that do not have an associated VTEP. This type of network policy can deny a rogue node from joining a VXLAN segment on a network attached device port that does not have an authorized VTEP. In addition, a multicast filter can be used to pass a multicast join with a VNI that matches the authorized VTEP VNI and drop a multicast join that has a mismatching VNI. For example and in one embodiment, if network access device 306C has a policy on the port coupled to the rogue node 316A to filter an IGMP join on that port because that port does not have an authorized VTEP, the rogue node could not join either VXLAN segment 314A-B. In another example and another embodiment, network access device 306A can have a network policy for the port associated with VTEP 308A to pass a multicast join with a VNI that matches the VNI of the VTEP 308A and drop a multicast join with a VNI that does not match the VNI of that VTEP 308A. Thus, the multicast join filter prevents a rogue node from joining on a port that is not authorized to have a VTEP or a multicast join with a mismatching VNI.

In one embodiment, by having an ACL on a port that has an authorized VTEP, where the ACL passes/drops network data with/without a VNI of the authorized VTEP, the ACL allows a network access device to block network data that does not have this VNI. This, in effect, restricts this port to communicate the network data of the associated VXLAN segment. In one embodiment, this type of ACL prevents an authorized member of one VXLAN segment transmitting network data for this VXLAN segment into another VXLAN segment. In addition, this type of ACL further prevents a VM that is not authorized for a VXLAN segment from receiving network data via a VTEP that terminates that VXLAN segment.

In one embodiment, by having an ingress ACL on ports that do not have an authorized VTEP to drop VXLAN encapsulated traffic prevents an unauthorized VM from injecting network data into the VXLAN segment data traffic. In addition, this type of ACL can prevent source address spoofing. Furthermore, this type of ACL can prevent an unauthorized VM from injecting traffic into the VXLAN control plane (e.g. transmission of unauthorized IGMP join/leave messages). In one embodiment, an unauthorized VM injecting unauthorized IGMP join/leave messages can affect any and all VXLAN segments.

In one embodiment, the NAE 318 applies this network security policy to the affected network access device via a system management network 322. In this embodiment, the system management network is an out-of-band network that is used by the NAE 318 to manage the network access devices 304A-B and/or network access devices 306A-D. The NAE 318 sends commands to these network access devices 304A-B and/or 306A-D via the system management network 322 and can receive information from these devices over the same network 322. Securing the VXLAN segments is described in further detail below with reference to FIGS. 4-5.

In one embodiment, the NAE 318 can test the VXLAN segments to determine if there is a problem with the configuration and/or topology of one, some, or all of the VXLAN segments. In this embodiment, the NAE 318 injects test traffic at one of the network access devices and monitors the network access devices on the system 300 for the appearance and/or the lack of appearance of the test traffic. In one embodiment, NAE 318 learns the VXLAN network policy, determines which network access device to inject test traffic, and predicts the results of test traffic injection. NAE 318 further injects the test traffic and monitors the network access devices for the appearance of the test traffic. If the test shows any errors, the NAE 318 reports the errors.

In one embodiment, the test traffic injected by the NAE 318 is VXLAN encapsulated test traffic with a particular VNI. In this embodiment, the injected test traffic should appear at network access devices that are part of the VXLAN segment that has the same VNI as the VXLAN encapsulated test traffic. In addition, this VXLAN encapsulated test traffic should not appear at network access device that do not participate in that VXLAN segment. For example and in one embodiment, if the NAE 318 injects VXLAN encapsulated test traffic with the VNI of VXLAN segment 314A at network access device 304A, the VXLAN encapsulated test traffic should appear at network access devices 304A-B, 306A, 306C, and 306D, but should not appear at network access device 306B. In another embodiment, if an error is shown in the test, NAE 318 can take corrective action to try to the error shown in the test. In one embodiment, the NAE 318 takes corrective action by determining and applying a network security policy as described above. Testing the VXLAN segments is described further below with reference to FIG. 6 below.

In another embodiment, the NAE 318 is part of the SDN Controller 302. In this embodiment, the NAE 318 can communicate with the network access devices 304A-B and 306A-D via the system management network 322 and/or via the underlying network 312. In one embodiment, the NAE 318 includes network policy monitoring and enforcement module 320 to secure and test the VXLAN segments. While the system 300 in FIG. 1 is described with reference to a VXLAN network, the invention described herein can be used for other virtualized networks (e.g., NVGRE, STT, and OTV).

Figure 4:
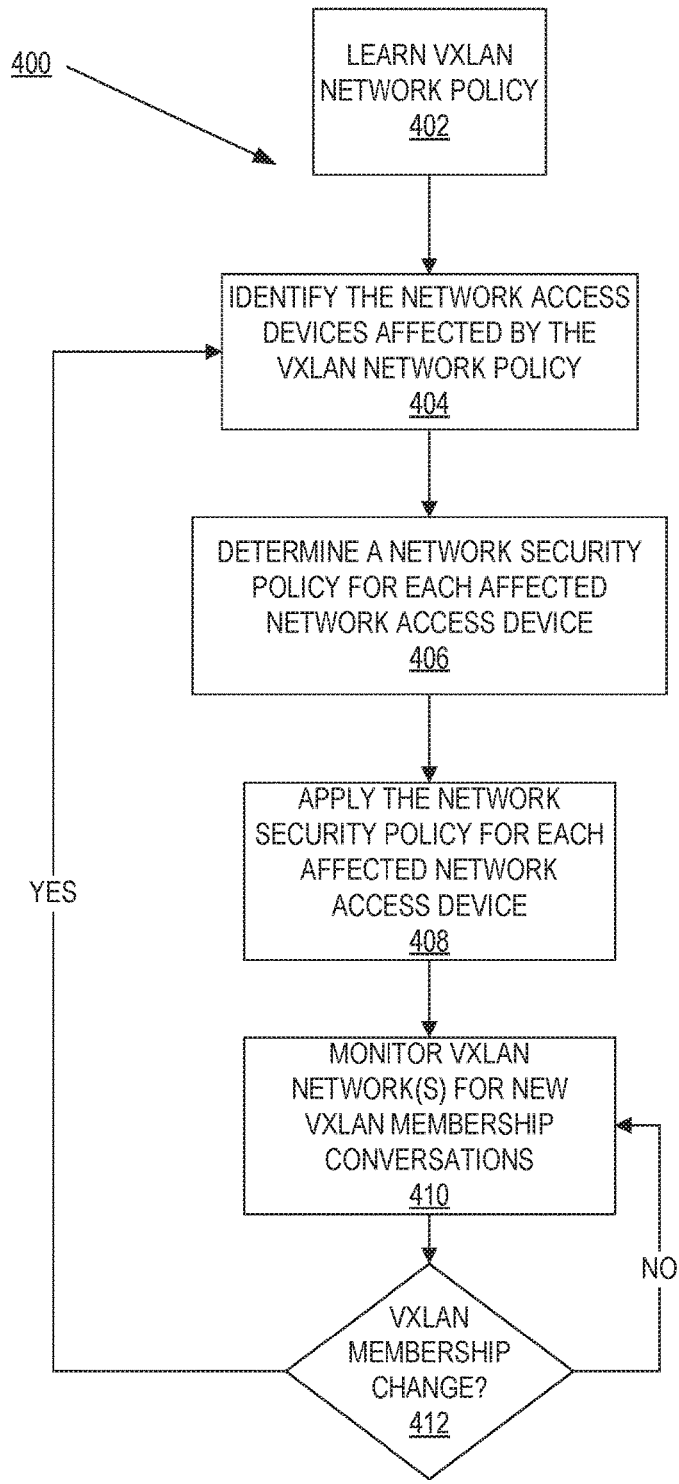
FIG. 4 is a flow diagram illustrating a process to secure a dynamic virtualized network by learning a current network policy of the virtualized networks and generating a network security policy for these virtualized networks in accordance with an embodiment of the present invention.

FIG. 4 is a flow diagram of one embodiment of a process 400 to secure a dynamic virtualized network by learning a current network policy of the virtualized networks and generating a network security policy for these virtualized networks. In one embodiment, the network automation engine performs process 400 to secure a virtualized network, such as NAE 318 of FIG. 3 above. In FIG. 4, process 400 begins by learning a current VXLAN network policy at block 402. In one embodiment, the current VXLAN network policy identifies authorized VTEPs and which port of which network access devices has an authorized VTEP. In one embodiment, process 400 learns the current network policy from a SDN controller, such as SDN controller 302 as described above with reference to FIG. 3. In one embodiment, the current network policy includes a plurality of network policy elements, where each network policy elements for the current network policy identify an authorized VTEP and location of that VTEP (e.g., which port of which network access device has that VTEP). In another embodiment, process 400 learns of the VXLAN network policy by snooping on multicast conversations. For example and in one embodiment, process 400 determines the authorized VTEPs and port location by snooping on which IGMP joins/leaves are being transmitted in the VXLAN segments. In one embodiment, process 400 can build a running tally of which VMs are on each VXLAN segment. In addition, process 400 can compare this running tally with the configured set of VTEPs and ports. In one embodiment, process 400 can initially learn the VXLAN current network policy, learn this network policy at periodic intervals, in response to an event, etc.

At block 404, process 400 identifies the network access devices that are affected by the current network policy. In one embodiment, the affected network access devices are the network access devices that participate in one or more VXLAN segments. For example and in one embodiment, network access devices 304A-B and 306A-D as illustrated in FIG. 3 are the network access devices affected by the current network access policy.

Process 400 determines a network security policy for each of the affected network access device(s) at block 406. In one embodiment, the network security policy is a set of network policy elements that are used to secure ports of the affected network access devices. For example and in one embodiment, a network policy element for the network security policy can be a multicast join filter to allow multicast groups to learn the VNIs for an authorized port and drop other multicast joins, create access control lists (ACL) on a port that has an VTEP to pass authorized VNI-tagged traffic and drop other types of traffic, and/or create ingress ACLs to drop VXLAN encapsulated traffic on a port that does not have an attached VTEP. In one embodiment, there is a network security policy for each affected network device and this network security policy may be the same and/or different for different network access devices. Determining a network security policy is described further below with reference to FIG. 5.

At block 408, process 400 applies the network security policy for each affected network access device. In one embodiment, process 400 applies the network security policy by sending a set of commands to implement the network security policy. For example and in one embodiment, the commands can be applied to the target network access device using a network management protocol (e.g., Simple Network Management Protocol (SNMP), Simple Object Access Protocol (SOAP), Representational State Transfer type Application Programming Interface (RESTful API), Hypertext Transfer Protocol (HTTP), HTTP over Secure Sockets layer (HTTPs), Network Configuration Protocol (NetConf), Secure Shell (SSH), command line interface, etc.).

Process 400 monitors the VXLAN segments for new VXLAN memberships conversations at block 410. In one embodiment, process 400 monitors the VXLAN segments for a change in the VXLAN membership. For example and in one embodiment, process 400 snoops for IGMP join/leave messages that indicate whether a VM has joined or left a VXLAN segment. At block 412, process 400 determines if there is a change in the VXLAN membership. If there is, process 400 adds the change in membership to the current network policy and execution proceeds to block 404 above. If not, execution proceeds to block 410 above.

Figure 5:
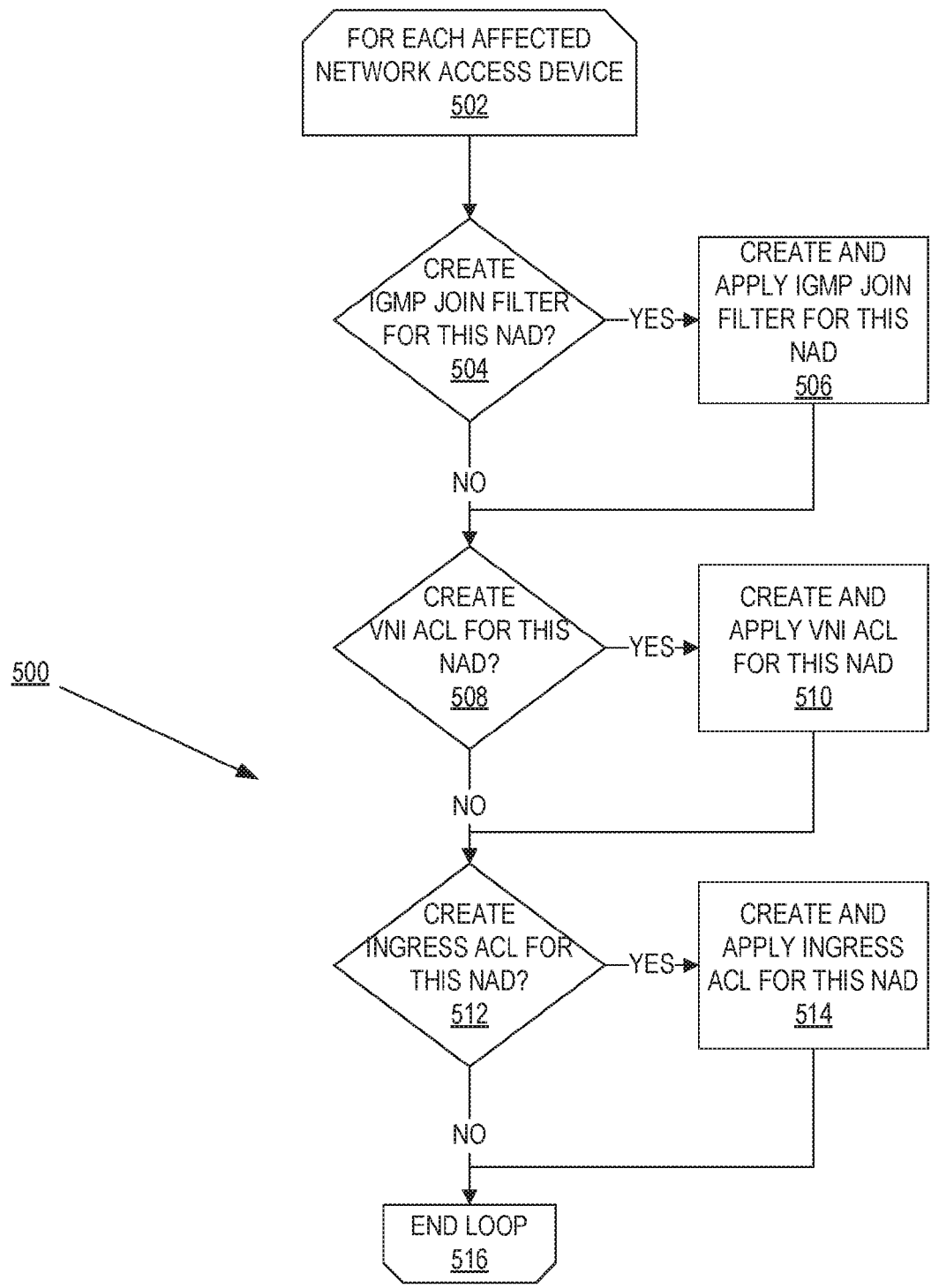
FIG. 5 is a flow diagram illustrating a process to determine a network security policy for each affected network access device of a plurality of network access devices in accordance with an embodiment of the present invention.

As described above, process 400 determines a network security policy for the affected network access devices. FIG. 5 is a flow diagram of one embodiment of a process 500 to determine a network security policy for each affected network access device of a plurality of network access devices. In one embodiment, process 400 performs process 500 to determine a network security policy for the affected network access devices at block 406 in FIG. 4 above. In FIG. 5, process 500 begins by performing a processing loop (blocks 502-516) to determine a network security policy for each affected network access device. At block 504, process 500 determines if a multicast join filter should be created for the one or more ports of that network access device. In one embodiment, the multicast join filter drops the multicast join on a port that does not have an authorized VTEP, drops the multicast join on a port that does have an authorized VTEP and the multicast join does not have a VNI of that authorized VTEP, and/or passes the multicast join on a port that has an authorized VTEP and the multicast join has the VNI of that authorized VTEP. In one embodiment, the multicast join filter is created for ports of network access device that participate in one or more VXLAN segments. In one embodiment, the multicast join filter filters IGMP join packets. If the multicast join filter is to be created, at block 506, process 500 creates the multicast join filter for one, some, or all of the ports of that network access device. While in one embodiment, the multicast join filter is applied to each port of the network access device, in alternate embodiments, the multicast join filter is applied to some of the ports of the network access device (e.g., applied to ports that are up, ports that are not devoted solely to a system management network, etc.) Execution proceeds to block 508. If the multicast join filter is not to be created, execution proceeds to block 508.

At block 508, process 500 determines if a VNI ACL is to be created for that network access device. In one embodiment, a VNI ACL passes VXLAN-encapsulated traffic on a port that has a VTEP to pass authorized VNI-tagged traffic and drop other types of traffic. In one embodiment, this ACL is created for ports on the network access device that is used to restrict ports to specific VXLAN-encapsulated network data. For example and in one embodiment, the port on network access device 306A that couples to network access device 304A could have the network data to be communicated be restricted to VXLAN-encapsulated with the same VNI as the VNI for VXLAN segment 314A. If the VNI ACL is to be created for one or more ports of the network access device, at block 510, process 500 creates the VNI ACLs for the appropriate ports of that network access device. While in one embodiment, the VNI ACL is applied to each port of the network access device, in alternate embodiments, the VNI ACL is applied to some of the ports of the network access device (e.g., applied to ports associated with a VTEP, etc.) Execution proceeds to block 512. If the VNI ACL is not to be created, execution proceeds to block 512.

At block 512, process 500 determines if an ingress ACL to drop VXLAN encapsulated traffic on a port that does not have an attached VTEP is to be created. In one embodiment, this type of ACL is used to deny VXLAN-encapsulated traffic from entering a VXLAN segment on a port without an authorized VTEP associated with that port. For example and in one embodiment, process 500 creates this ingress ACL on ports of the network access device that do not have an associated VTEP. If the ingress ACL is to be created for one or more ports of the network access device, at block 514, process 500 creates the ingress ACLs for the appropriate ports of that network access device. While in one embodiment, the ingress ACLs is applied to each port of the network access device, in alternate embodiments, the ingress ACLs is applied to some of the ports of the network access device (e.g., applied to ports that are up, ports that are not devoted to a system management network, etc.) Execution proceeds to block 516. If the ingress ACL is not to be created, execution proceeds to block 516. The processing loop ends at block 516.

Figure 6:
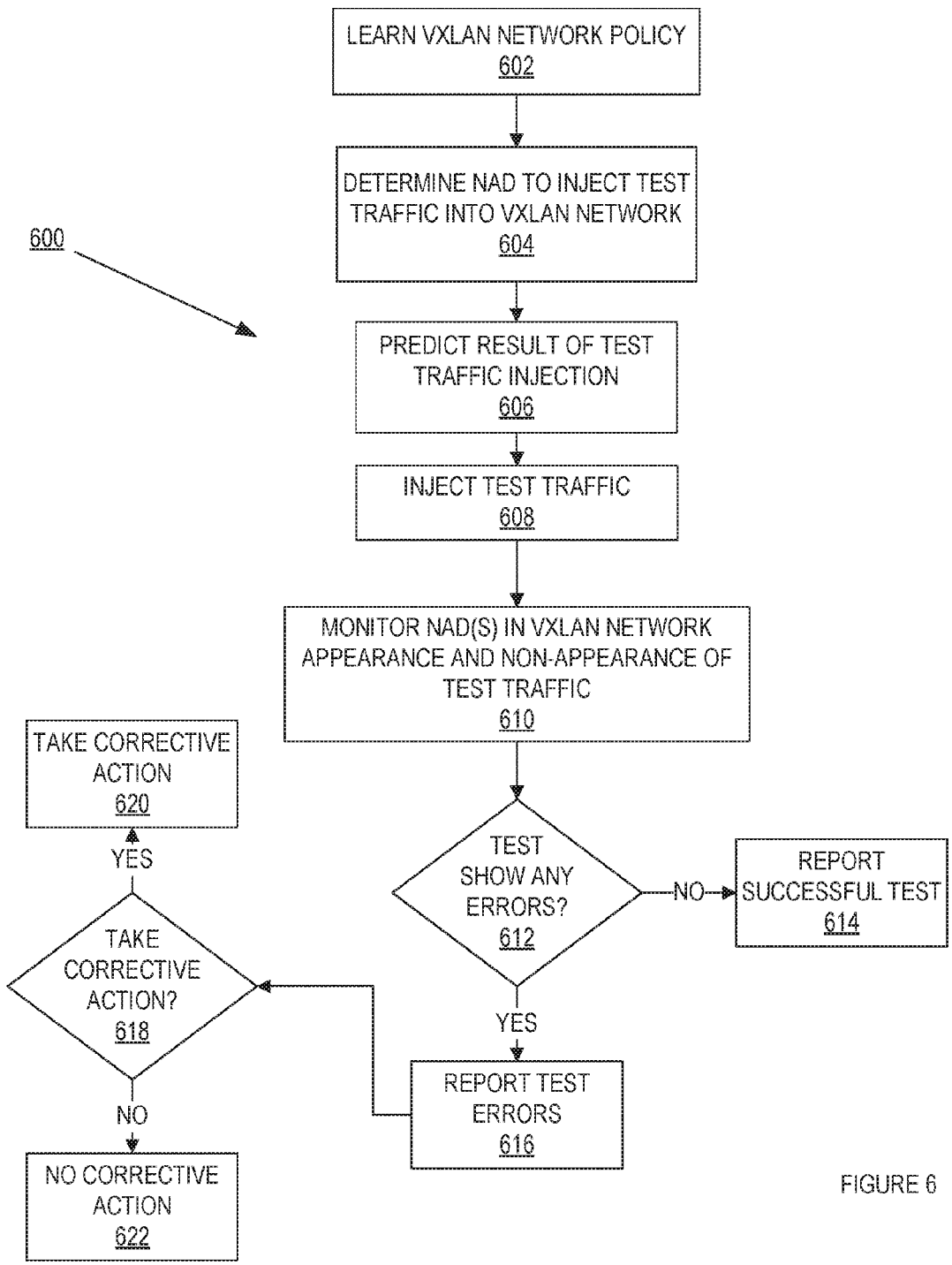
FIG. 6 is a flow diagram illustrating a process to test a security of a network policy of the dynamic virtualized network in accordance with an embodiment of the present invention.

As described above, the NAE can secure that virtualized network as well test this virtualized network for a problem with the configuration and/or topology of one, some, or all of the VXLAN segments. FIG. 6 is a flow diagram of one embodiment of a process 600 to test a security of a network policy of the dynamic virtualized network. In one embodiment, the network automation engine to secure a virtualized network, such as NAE 318 described above with reference to FIG. 3, performs process 600. In FIG. 6, process 600 begins by learning the VXLAN network policy at block 602. In one embodiment, the current VXLAN network policy identifies authorized VTEPs and which port of which network access devices have an authorized VTEP. In one embodiment, process 600 learns the current network policy from a SDN controller, such as SDN controller 302 as described above with reference to FIG. 3. In one embodiment, the current network policy includes a plurality of network policy elements, where each network policy elements for the current network policy identify an authorized VTEP and location of that VTEP (e.g., which port of which network access device has that VTEP). In another embodiment, process 600 learns of the VXLAN network policy by snooping on multicast conversations. For example and in one embodiment, process 400 determines the authorized VTEPs and port location by snooping on which IGMP joins/leaves are being transmitted in the VXLAN segments. In one embodiment, process 400 can build a running tally of which VMs are on each VXLAN segment. In addition, process 400 can compare this running tally with the configured set of VTEPs and ports. In one embodiment, process 600 can initially learn the VXLAN current network policy, learn this network policy at periodic intervals, in response to an event, etc.

At block 604, process 600 determines which network access device to inject test traffic into the one or more VXLAN segments. In one embodiment, process 600 determines which network access device to inject test traffic based on the network policy of network access devices and/or the topology of the physical and/or virtualized networks. In one embodiment, process 600 determines to inject the test traffic in a network access device that participates in a single VXLAN segment. In another embodiment, process 600 determines to inject the test traffic in a network access device that participates in multiple or no VXLAN segments.

Process 600 predicts the result of the test traffic injection at block 606. In one embodiment, the test traffic injected by process 600 is VXLAN encapsulated test traffic with a particular VNI. In this embodiment, the injected test traffic should appear at network access devices that are part of the VXLAN segment that has the same VNI as the VXLAN encapsulated test traffic. In addition, this VXLAN encapsulated test traffic should not appear at network access device that does not participate in that VXLAN segment. For example and in one embodiment, if process 600 injects VXLAN encapsulated test traffic with the VNI of VXLAN segment 314A at network access device 304A, the VXLAN encapsulated test traffic should appear at network access devices 304A-B, 306A, 306C, and 306D, but should not appear at network access device 306B.

At block 608, process 600 injects the test traffic at the network access device determined at block 604 above. In one embodiment, process 600 injects VXLAN-encapsulated test traffic at a particular network access device. For example and in one embodiment, process 600 injects VXLAN-encapsulated test traffic that has VNI A into a VXLAN segment identified with VNI B. In one embodiment, the test traffic includes a packet with specially marked payload that indicates that the packet is test traffic.

Process 600 monitors the network access devices for the appearance and non-appearance of the test traffic at block 610. In one embodiment, process 600 monitors the test traffic by monitoring the network access devices for a reported error. For example and in one embodiment, process 600 injects VXLAN-encapsulated test traffic that has VNI A into a VXLAN segment identified with VNI B. In this example, process 600 monitors the network access devices associated with VXLAN segment with the VNI B for an error (e.g., an alert, a log entry, bump in a statistic that tracks if illegal VXLAN traffic was dropped, etc.).

At block 612, process 600 determines if the test shows any errors. In one embodiment, if the test traffic appearance and/or non-appearance is the same as the prediction of the test traffic injection determined at block 606, the test is successful with no errors. In another embodiment, if the test traffic does not appear as predicted and/or the traffic does not appear as predicted, the test shows an error. If there are no errors, process 600 reports a successful test at block 614. If there are errors in the test, process 600 reports the test errors at block 616. At block 618, process 600 determines if to take corrective action based on the reported errors. In one embodiment, corrective action that can be taken is terminating the VXLAN segment, disconnecting one or more specific ports of one or more network access devices, adding a source specific ACL that block certain hosts and/or ports, etc. and/or a combination thereof. If a corrective action is taken, at block 620, process 600 performs the corrective action. In one embodiment, process 600 determines and applies a network security policy as described above with reference to FIG. 4. If no corrective action is to be taken, process 600 does not perform any corrective action at block 622.

Figure 7:
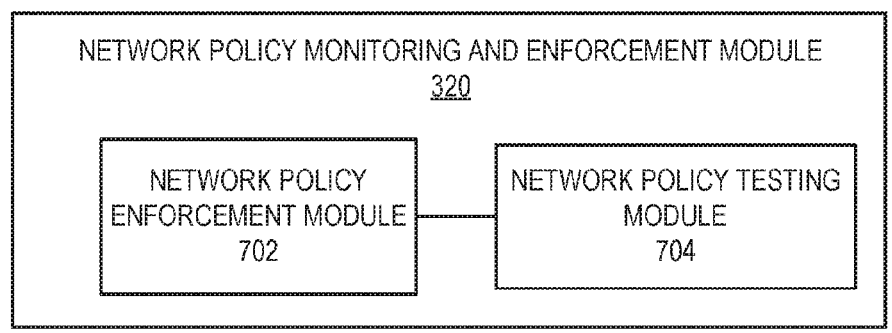
FIG. 7 is a block diagram of network policy monitoring and enforcement module that secures and tests a dynamic virtualized network in accordance with an embodiment of the present invention.

FIG. 7 is a block diagram of network policy monitoring and enforcement module 320 that secures and tests a dynamic virtualized network. In FIG. 7, network policy monitoring and enforcement module 320 includes network policy enforcement module 702 and network policy testing module 704. In one embodiment, the network policy enforcement module 702 secures the overlaid virtualized network as described above with reference to FIG. 4. The network policy testing module 704 tests the overlaid virtualized network as described above with reference to FIG. 6.

Figure 8:
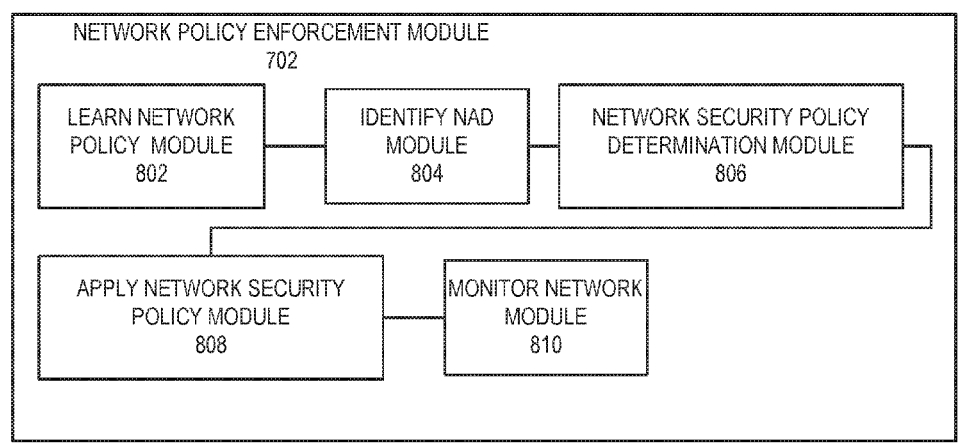
FIG. 8 is a block diagram of a network policy monitoring and enforcement module that secures a dynamic virtualized network in accordance with an embodiment of the present invention.

FIG. 8 is a block diagram of a network policy enforcement module 702 that secures a dynamic virtualized network. In FIG. 8, the network policy enforcement module 702 includes a learn network policy module 802, identify network access device module 804, security determination module 806, apply network security policy module 808, and monitor network module 810. In one embodiment, the learn network policy module 802 learns the current network policy as described above with reference to FIG. 8, block 802. The identify network access device module 804 identifies the affected network access devices as described above with reference to FIG. 8, block 804. The network security policy determination module 806 determines a network security policy as described above with reference to FIG. 8, block 806. The apply network security policy module 808 applies the network security policy as described above with reference to FIG. 8, block 808. The monitor network module 810 monitors the network as described above with reference to FIG. 8, block 810.

Figure 9:
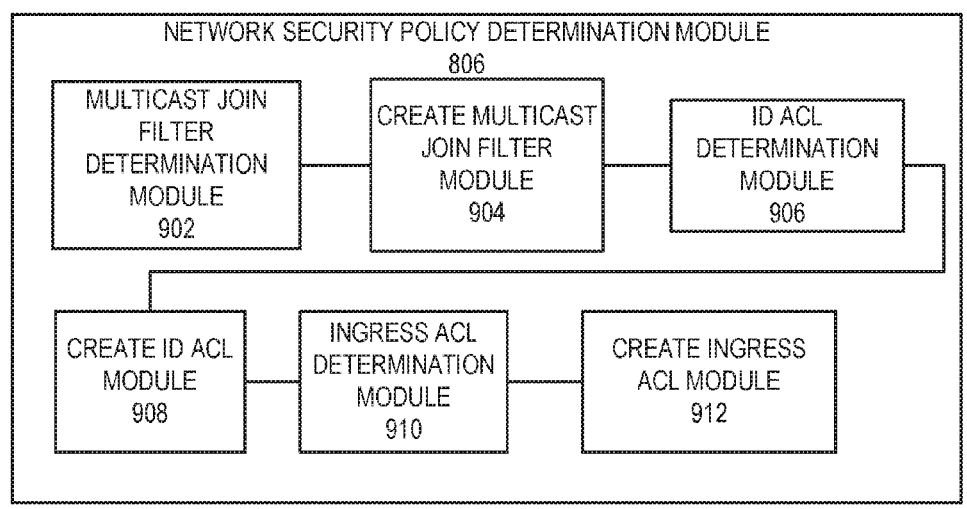
FIG. 9 is a block diagram of a network security policy determination module that determines a network security policy for each affected network access device of a plurality of network access devices in accordance with an embodiment of the present invention.

FIG. 9 is a block diagram of a network security policy determination module 806 that determines a network security policy for each affected network access device of a plurality of network access devices. In one embodiment, the network security policy determination module 806 includes multicast join filter determination module 902, create multicast join filter module 904, ID ACL determination module 906, create ID ACL module 908, ingress ACL determination module 910, and create ingress ACL module 912. In one embodiment, the multicast join filter determination module 902 determines if a multicast join filter is to be created as described above with reference to FIG. 5, block 504. The create multicast join filter module 904 creates the multicast join filter as described above with reference to FIG. 5, block 506. The ID ACL determination module 906 determines if a VNI ACL is to be created as described above with reference to FIG. 5, block 508. The create ID ACL module 908 creates the VNI ACL as described above with reference to FIG. 5, block 510. The ingress ACL determination module 910 determines if an ingress ACL should be created as described above with reference to FIG. 5, block 512. The create ingress ACL module 912 creates the ingress ACL as described above with reference to FIG. 5, block 514.

Figure 10:
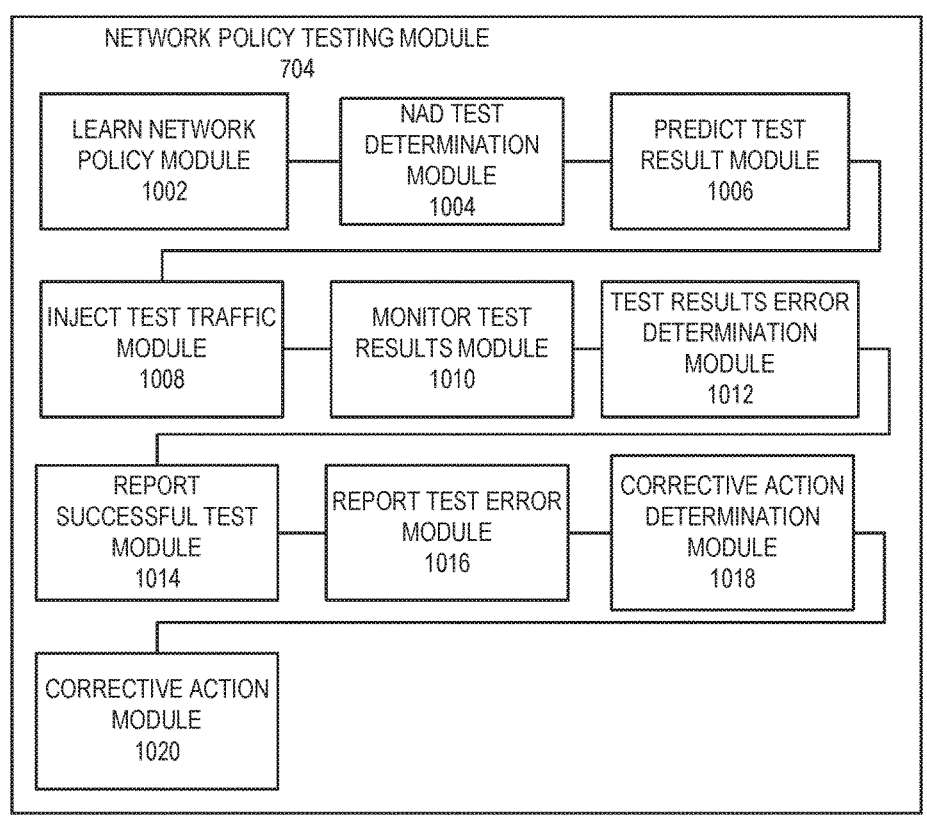
FIG. 10 is a block diagram of a network policy testing module that tests a dynamic virtualized network in accordance with an embodiment of the present invention.

FIG. 10 is a block diagram of a network policy testing module 704 that tests a dynamic virtualized network. In FIG. 10, network policy testing module 704 include learn network policy module 1002, network access device test determination module 1004, predict test result module 1006, inject test traffic module 1008, monitor test results module 1010, test results error determination module 1012, report successful test module 1014, report test error module 1014, corrective action determination module 1016, and corrective action module 1018. In one embodiment, the learn network policy module 1002 learns the network policy as described above with reference to FIG. 6, block 602. The network access device test determination module 1004 determines the affected network access devices as described above with reference to FIG. 6, block 604. The predict test result module 1006 predicts the test results as described above with reference to FIG. 6, block 606. The inject test traffic module 1008 injects the test traffic as described above with reference to FIG. 6, block 608. The monitor test results module 1010 monitors the network for test results as described above with reference to FIG. 6, block 610. The test results error determination module 1012 determines if there are any test errors as described above with reference to FIG. 6, block 612. The report successful test module 1014 reports a successful test as described above with reference to FIG. 6, block 614. The report test error module 1016 reports the test error as described above with reference to FIG. 6, block 616. The corrective action determination module 1018 determines if corrective action is to be taken as described above with reference to FIG. 6, block 618. The corrective action module 1020 takes the corrective action as described above with reference to FIG. 6, block 620.

Figure 11:
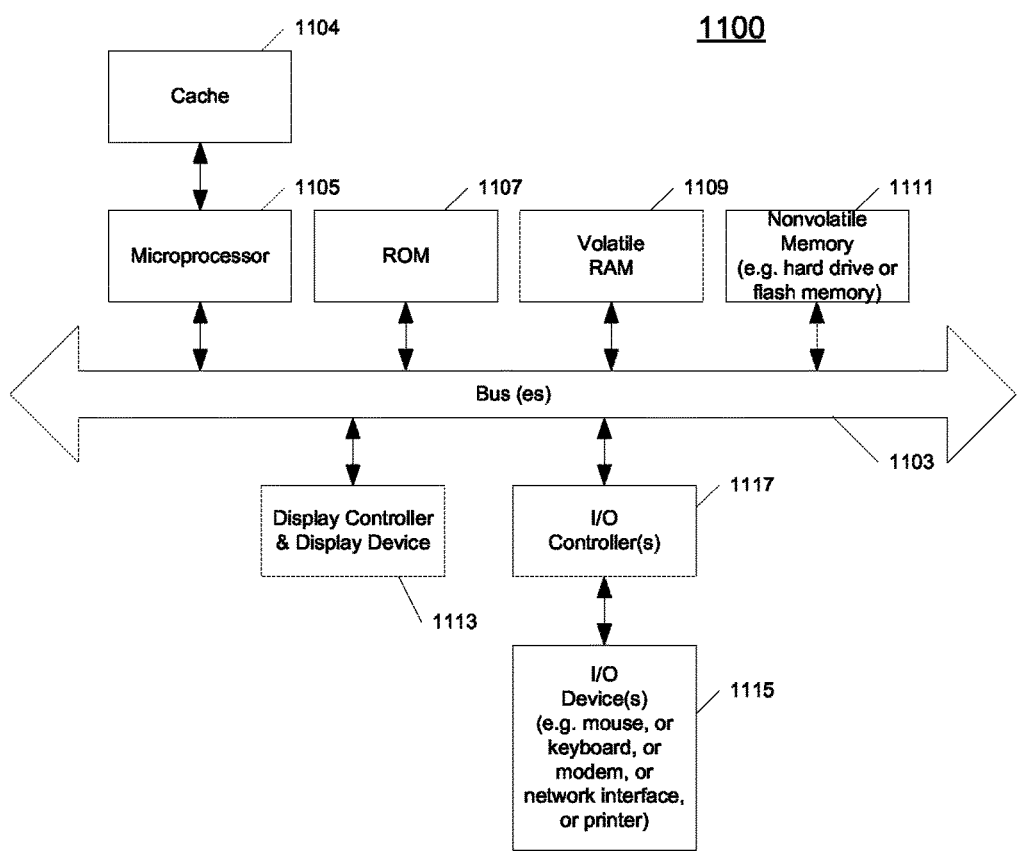
FIG. 11 illustrates one example of a typical computer system, which may be used in conjunction with various embodiments of the present invention.

FIG. 11 shows one example of a data processing system 1100, which may be used with one embodiment of the present invention. For example, the system 1100 may be implemented including a NAE 318 as shown in FIG. 3. Note that while FIG. 11 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 11, the computer system 1100, which is a form of a data processing system, includes a bus 1103 which is coupled to a microprocessor(s) 1105 and a ROM (Read Only Memory) 1107 and volatile RAM 1109 and a non-volatile memory 1111. The microprocessor 1105 may retrieve the instructions from the memories 1107, 1109, 1111 and execute the instructions to perform operations described above. The bus 1103 interconnects these various components together and also interconnects these components 1105, 1107, 1109, and 1111 to a display controller and display device 1115 and to peripheral devices such as input/output (I/O) devices which may be mice, keyboards, modems, network interfaces, printers and other devices which are well known in the art. Typically, the input/output devices 1115 are coupled to the system through input/output controllers 1117. The volatile RAM (Random Access Memory) 1109 is typically implemented as dynamic RAM (DRAM), which requires power continually in order to refresh or maintain the data in the memory.

The mass storage 1111 is typically a magnetic hard drive or a magnetic optical drive or an optical drive or a DVD RAM or a flash memory or other types of memory systems, which maintain data (e.g. large amounts of data) even after power is removed from the system. Typically, the mass storage 1111 will also be a random access memory although this is not required. While FIG. 11 shows that the mass storage 1111 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 1103 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "learning," "receiving," "determining," "transmitting," "sending," "forwarding," "detecting," "applying," "injecting," "communicating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A method comprising:
    receiving, by a network automation engine of a software defined network (SDN) controller associated with a dynamic virtualized network that is overlaid on a physical network, a current network policy of the dynamic virtualized network, wherein the current network policy includes a plurality of network policy elements and each of the plurality of network policy elements identifies (i) an authorized endpoint of a plurality of authorized endpoints within the dynamic virtualized network, (ii) a network access device of a plurality of network access devices within the dynamic virtualized network, and (iii) a port of the network access device with which the authorized endpoint is associated;
    generating, by the network automation engine, a network security policy for the dynamic virtualized network based on the current network policy, by, for each network access device of the plurality of network access devices:
        determining whether to create one or more security measures for the network access device by evaluating those of the plurality of network policy elements involving the network access device, wherein each of the one or more security measures specifies how network traffic in the dynamic virtualized network is to be processed by a port of a plurality of ports of the network access device; and
        when said determining is affirmative, creating the one or more security measures; and
    applying, by the network automation engine, the network security policy to each network access device of the plurality of network access devices that is affected by the network security policy.

2. The method of claim 1, wherein the dynamic virtualized network comprises a Virtual eXtensible Local Area Network (VxLAN) and the physical network comprises a layer 3 network.

3. The method of claim 1, wherein a security measure of the one or more security measures comprises a multicast join filter that passes a multicast join request on a port of the network access device with which an authorized endpoint of the plurality of authorized endpoints is associated.

4. The method of claim 1, wherein a security measure of the one or more security measures comprises a multicast join filter that drops a multicast join request on a port of the network access device with which none of the plurality of authorized endpoints are associated.

5. The method of claim 1, wherein a security measure of the one or more security measures comprises an access control list on a port of the network access device with which an authorized endpoint of the plurality of authorized endpoints is associated and wherein the access control list allows network that includes an identifier associated with the authorized endpoint traffic to pass through the port.

6. The method of claim 5, wherein the identification comprises a VxLAN Network Identifier (VNI).

7. The method of claim 1, wherein a security measure of the one or more security measures comprises an access control list on a port of the network access device with which an authorized endpoint of the plurality of authorized endpoints is associated and wherein the access control list causes network traffic that does not include an identifier associated with the authorized endpoint to be dropped.

8. The method of claim 1, wherein a security measure of the one or more security measures comprises an access control list on a port of the network access device with which none of the plurality of authorized endpoints are associated and wherein the access control list causes network traffic that is encapsulated for the dynamic virtualized network to be dropped.

9. The method of claim 1, wherein the network access device comprises a switch or a router.

10. The method of claim 1, wherein the network access device comprises a virtual device.

11. A non-transitory machine-readable medium having embodies therein executable instructions representing a network automation engine, which when executed by one or more processors of a software defined networking (SDN) controller associated with a dynamic virtualized network that is overlaid on a physical network perform a method comprising:
receiving a current network policy of the dynamic virtualized network, wherein the current network policy includes a plurality of network policy elements and each of the plurality of network policy elements identifies (i) an authorized endpoint of a plurality of authorized endpoints within the dynamic virtualized network, (ii) a network access device of a plurality of network access devices within the dynamic virtualized network, and (iii) a port of the network access device with which the authorized endpoint is associated;
generating a network security policy for the dynamic virtualized network based on the current network policy, by, for each network access device of the plurality of network access devices:
determining whether to create one or more security measures for the network access device by evaluating those of the plurality of network policy elements involving the network access device, wherein each of the one or more security measures specifies how network traffic in the dynamic virtualized network is to be processed by a port of a plurality of ports of the network access device; and
when said determining is affirmative, creating the one or more security measures; and
applying the network security policy to each network access device of the plurality of network access devices that is affected by the network security policy.

12. The non-transitory machine-readable medium of claim 11, wherein the dynamic virtualized network comprises a Virtual eXtensible Local Area Network (VxLAN) and the physical network comprises a layer 3 network.

13. The non-transitory machine-readable medium of claim 11, wherein a security measure of the one or more security measures comprises a multicast join filter that passes a multicast join request on a port of the network access device with which an authorized endpoint of the plurality of authorized endpoints is associated.

14. The non-transitory machine-readable medium of claim 1, wherein a security measure of the one or more security measures comprises a multicast join filter that drops a multicast join request on a port of the network access device with which none of the plurality of authorized endpoints are associated.

15. The non-transitory machine-readable medium of claim 11, wherein a security measure of the one or more security measures comprises an access control list on a port of the network access device with which an authorized endpoint of the plurality of authorized endpoints is associated and wherein the access control list allows network that includes an identifier associated with the authorized endpoint traffic to pass through the port.

16. The non-transitory machine-readable medium of claim 15, wherein the identification comprises a VxLAN Network Identifier (VNI).

17. The non-transitory machine-readable medium of claim 11, wherein a security measure of the one or more security measures comprises an access control list on a port of the network access device with which an authorized endpoint of the plurality of authorized endpoints is associated and wherein the access control list causes network traffic that does not include an identifier associated with the authorized endpoint to be dropped.

18. The non-transitory machine-readable medium of claim 1, wherein a security measure of the one or more security measures comprises an access control list on a port of the network access device with which none of the plurality of authorized endpoints are associated and wherein the access control list causes network traffic that is encapsulated for the dynamic virtualized network to be dropped.

19. The non-transitory machine-readable medium of claim 11, wherein the network access device comprises a switch or a router.

20. The non-transitory machine-readable medium of claim 1, wherein the network access device comprises a virtual device.

* * * * *